United States Patent [19]

van der Schoot

[11] Patent Number: 4,708,250

[45] Date of Patent: Nov. 24, 1987

[54] METHOD AND AN APPARATUS FOR HANDLING VULNERABLE ARTICLES, AS WELL AS A CONTAINER ADAPTED TO APPLY THIS METHOD

[75] Inventor: Jelle van der Schoot, Aalten, Netherlands

[73] Assignee: Staalkat B.V., Aalten, Netherlands

[21] Appl. No.: 515,269

[22] Filed: Jul. 19, 1983

[30] Foreign Application Priority Data

Jul. 23, 1982 [NL] Netherlands .......................... 8202981
Jan. 26, 1983 [NL] Netherlands .......................... 8300287

[51] Int. Cl.$^4$ .......................... B07C 5/28; A01K 43/08
[52] U.S. Cl. .................................... 209/592; 198/465.1;
198/690.1; 198/803.01; 209/513; 209/596;
209/912
[58] Field of Search ........ 209/510, 512, 513, 592–596,
209/645, 646, 903, 912; 177/262; 198/472, 504,
505, 648, 690, 465.1, 690.1, 803.01

[56] References Cited

U.S. PATENT DOCUMENTS

| | | | |
|---|---|---|---|
| 1,068,695 | 7/1913 | Nunneley | 209/510 |
| 2,347,068 | 4/1944 | Sneed et al. | 209/513 |
| 2,980,252 | 4/1961 | Bray et al. | 209/646 |
| 3,090,478 | 5/1963 | Stanley | 198/803.01 X |
| 3,410,406 | 11/1968 | Tsuda et al. | 209/594 |
| 3,432,034 | 3/1969 | Mosterd . | |
| 3,592,327 | 7/1971 | Koch et al. . | |
| 3,621,979 | 11/1971 | Kraeft | 198/648 |
| 3,640,384 | 2/1972 | Del Rosso | 209/593 X |
| 3,907,112 | 9/1975 | Shepovalov et al. | 209/513 |
| 3,941,237 | 3/1976 | MacGregor, Jr. | 198/803.01 |
| 4,024,053 | 5/1977 | Drew, Jr. et al. | 209/593 |
| 4,086,998 | 5/1978 | Van Der Schoot . | |
| 4,274,532 | 6/1981 | Johnson | 198/803.12 X |
| 4,442,932 | 4/1984 | Sashiki et al. | 198/505 X |
| 4,462,735 | 7/1984 | Bain et al. | 198/472 X |

FOREIGN PATENT DOCUMENTS

| | | | |
|---|---|---|---|
| 2826576 | 1/1980 | Fed. Rep. of Germany | 198/803.01 |
| 0333938 | 8/1930 | United Kingdom | 209/646 |

*Primary Examiner*—Randolph A. Reese
*Assistant Examiner*—Edward M. Wacyra
*Attorney, Agent, or Firm*—Cushman, Darby & Cushman

[57] ABSTRACT

A method and apparatus for transporting vulnerable products such as eggs, along successive stations and handling the same therein, each product at the beginning of the handling cycle being received separately in a container that is freely moveable in at least one direction during a part of the handling cycle, and being removed therefrom after the handling cycle. The container may be open at the top, narrowing towards the bottom, e.g. according to a truncated cone, and further comprising a foot extending perpendicularly to the container axis, the outer circumference of the foot being at least equal to the outer circumference of the upper edge of the container.

20 Claims, 10 Drawing Figures

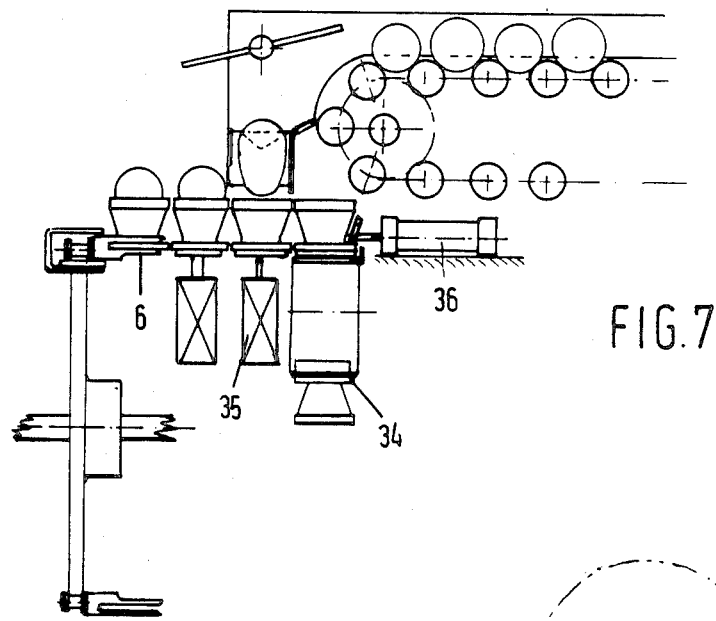
FIG. 7
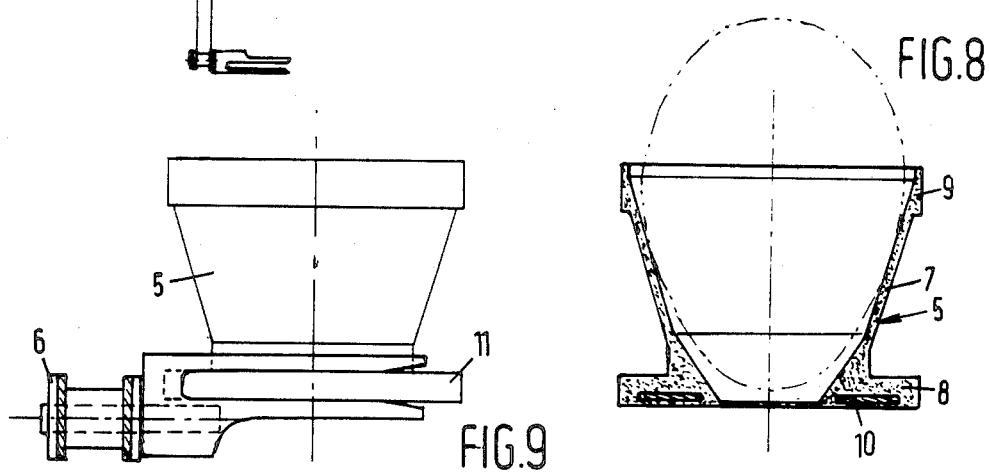
FIG. 8
FIG. 9
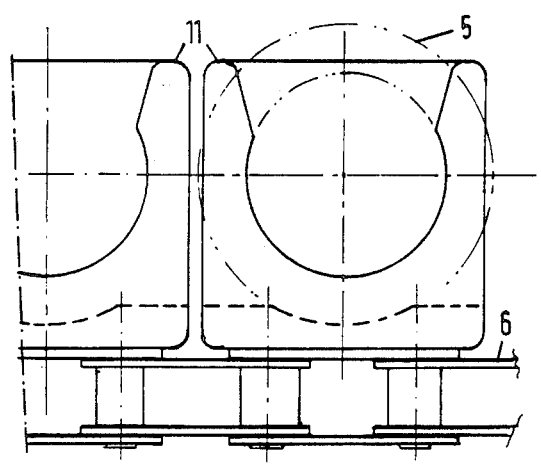
FIG. 10

METHOD AND AN APPARATUS FOR HANDLING VULNERABLE ARTICLES, AS WELL AS A CONTAINER ADAPTED TO APPLY THIS METHOD

The invention relates to a method of transporting articles along successive stations and handling the same therein, e.g. candling, weighing, encoding, grading and the like of vulnerable products, such as eggs.

U.S. Pat. No. 4,086,998 of Applicants discloses a method and apparatus for grading eggs, in which the eggs supplied on trays are transferred onto a weighing apparatus, then onto a conveyor belt, from which the eggs are transferred to buffer belts disposed along the conveyor belt, at the exit of which buffer belts the eggs are arranged according to a given pattern and are again transferred therefrom to a tray or the like carrier member (see also U.S. Pat. No. 3,973,667 of Applicants).

In this known method of grading eggs, nine transfers take place, starting from the supply until the putting of the graded egg into the tray or box, namely:
1st. from the tray to the candling roller conveyor;
2nd. from the roller conveyor to the scale;
3rd. from the scale to the egg carrier received in a conveyor chain;
4th. from the egg carrier to the buffer belt;
5th. from the buffer belt to the star wheel mechanism;
6th. from the star wheel mechanism to orienting rollers;
7th. from the orienting rollers to the tilting plates;
8th. from the tilting plates to the inserting mechanism; and
9th. from the inserting mechanism to the box or tray.

It will be clear that there is a risk of fracture in any of these nine steps. It is wellknown that fracture of eggs in a machine has to be avoided, not so much on account of the fracture of the single egg, but on account of the cumulative effect, fouling and resultant standstill of the machine, etc.

It is an object of the invention to remove this drawback.

To this effect a method of the above described type is characterized in that each article, at the beginning of the handling cycle, is separately received in a container that is freely movable in at least one direction during a part of the handling cycle, and is removed therefrom after the handling cycle. As a result, the number of transfers may be restricted, if desired, to two, i.e. from the tray wherein the eggs are supplied to the said container and after handling the article, from the container to a box or tray.

In a particular embodiment of the invention, each container supplied, at the weighing station, is first weighed in empty condition and, after the reception of a product therein, together therewith, thus determining the weight and the weight class of the article.

The invention further relates to a container adapted to be applied in the above described method, which container is open at the top, narrowing towards the bottom, e.g. according to one or more truncated cones, and further comprising a foot extending perpendicularly to the container axis, the outer circumference of said foot being at least equal to the outer circumference of the upper edge of the container.

The invention also relates to an apparatus for transporting vulnerable products such as eggs, along successive stations and handling the same therein, said apparatus comprising a plurality of conveyor members over at least some of which the articles are relatively freely movable in at least one direction, said apparatus being characterized in that freely movable containers are arranged on said conveyor members over which the articles are freely movable, for separately conveying the articles.

The invention further relates to a grading device comprising a feed belt, as well as a plurality of buffer belts arranged therealong, said apparatus being characterized in that the feed belt is fitted with gripping members for receiving the containers, while along the feed belt, at each of the buffer belts, there are arranged one or more expelling mechanisms for expelling the containers from the gripping members.

In a further embodiment of the invention, a bottom plate is arranged directly above the lower run of the buffer belt for transporting the empty containers, which bottom plate is magnetic, just as the return roller of said buffer belt disposed at the discharge end, each of the containers being provided with a part made of soft iron or other magnetizable material. Another possibility is that directly above each lower run of the buffer belt, there is arranged a bottom plate which is made of soft iron, just as the return roller of the buffer belt disposed at the discharge end of said buffer belt, the containers being provided with a magnet, so that the containers are carried along "hanging" from the lower run of the buffer belt.

When the articles are contained in a container during the entire handling cycle, two conveyor belts extending underneath the buffer belts may be provided for returning the containers from the buffer belts, one of these extending in the same direction as the feed belt, at which location the said bottom plates terminate, so that the containers hanging from the buffer belts are transferred onto said conveyor belt. In addition to the said conveyor belt, a second conveyor belt may be arranged which extends in opposite direction, and adjacent the lastmentioned buffer belt there may be provided a transfer apparatus above the said first and second conveyor belt. Said transfer apparatus may consist of a bottom plate which is extended relative to the other bottom plates, The first and second conveyor belt described ensure that all containers are returned along a track having the same pathlength to the starting point, viz. the feed belt or the weighing apparatus.

In a further embodiment of the invention, there may be provided adjacent the end of the second conveyor belt an inserting station for pushing the empty containers in the feed belt. Said inserting station may consist of a plurality of baffles arranged longitudinally above the conveyor belt and of a plurality of baffles arranged downstream thereof, transversely to the transport direction above the conveyor belt, each having a different length, while furthermore a plurality of inserting members are arranged at the end of said conveyor belt opposite the feed belt, adjacent the baffles disposed transversely to the transport direction. Through this arrangement, it is achieved that a great many containers can be quickly introduced simultaneously in the feed belt.

For transferring eggs from an orienting roller conveyor to the containers, there may be provided at the transfer location a chute and a mill and wing arranged thereabove.

Furthermore, when a plurality of guide plates are arranged above the discharge end of each buffer belt, each guide plate may be mounted on a hinged bracket, and be provided at a downstream end with a blocking member for containers, and be tiltable by means of a magnet or the like, so that the containers can pass.

Finally, the invention also relates to an apparatus for grading vulnerable articles, such as eggs, said apparatus comprising a weighing station and being characterized in that adjacent the end of the second conveyor belt there is provided an inserting station for placing the containers successively on a third conveyor belt, along which third conveyor belt there are arranged expelling members for transferring each container successively to a first scale or weighing cell disposed underneath a chute or the like, subsequently to a second scale or cell, and finally to the feed belt.

Some embodiments of the grading apparatus according to the invention will now be described, by way of example, with reference to the accompanying drawings, in which:

FIG. 3 is a diagrammatic front view on the line III—III of FIG. 1;

FIGS. 5, 6 and 7 are elevational views to FIGS. 1, 3 and 4 of a second embodiment of the egg grading apparatus according to the invention;

FIG. 8 is a longitudinal section of an egg container;

FIG. 9 is a part-sectional elevational view of a container received in a feed belt and FIG. 10 is a top view of the feed belt according to FIG. 9.

Figure 1:
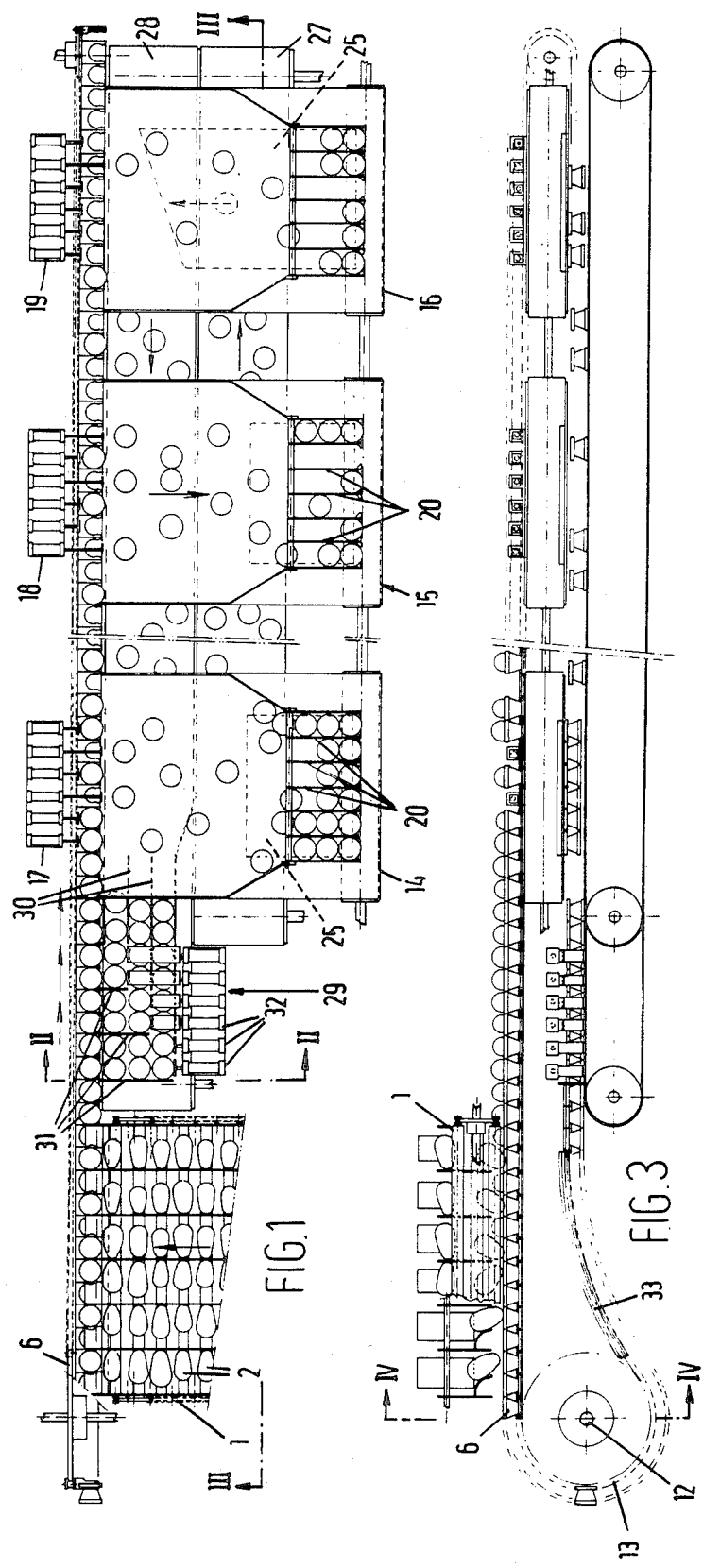
FIG. 1 is a top view of an egg grading apparatus, the weighing of the eggs having been effected already.

As shown in the drawing, an apparatus for transporting articles along successive stations and handling the same therein comprises an orienting roller conveyor 1, on which eggs 2 are oriented: the left half of the eggs supplied with the small end to the right and the right half of the eggs supplied with the small end to the left. Apparatus for orienting eggs are known per se from e.g. U.S. Pat. Nos. 2,895,589 and 3,024,889.

From the orienting roller conveyor, the eggs are transferred via a chute 3 and a mill wing 4 to containers 5 received in a feed belt 6.

As shown in FIG. 8, each container comprises a double frusto-conical body 7 having a broad foot 8. The frusto-conical body has a maximal diameter defined by a circular-cylindrical ring 9, which is equal to the diameter of the foot 8. In this manner it is achieved that the containers, on displacement over the buffer belt, cannot knock over each other, thus preventing fracture. Besides an annular magnet 10 is received in the foot of the container.

As shown in FIGS. 9 and 10, the links of the feed belt 6 are fitted with grippers 11: the grippers 11 are designed in such a manner that they can snappingly engage the containers at the portion just above the foot.

After the filling of all containers present opposite the orienting roller conveyor during standstill of the feed belt, the feed belt is moved a distance corresponding with the number of containers just filled, so that again a corresponding number of empty containers is brought in the filling positions.

The feed belt 6 is driven intermittently via a shaft 12 and a sprocket wheel 13.

As shown in the drawing, a plurality of buffer belts 14, 15 and 16, three in the embodiment shown, are arranged along the feed belt 6.

On arrival of the containers filled with weighed eggs at the buffer belt associated with the egg weight class in question, the respective containers are transferred during the standstill of the feed belt or chain 6 onto the buffer belt 14, 15 or 16 in question by means of an expelling mechanism 17, 18 or 19.

As shown in the drawing, each expelling mechanism 17, 18 or 19 is provided with some (in the present case six) cylinders corresponding with the number of containers per pitch of the intermittently driven feed belt, the free piston rod end of which is adapted to push the containers 5 out of the grippers 11 when the cylinders are operated. Whether a filled container is to be emptied, i.e. the egg received in the container pertains to the respective weigh class, is determined by a known per se control means of a microprocessor, not shown, which has received the weighing data immediately after weighing, from the weighing members, not shown in FIGS. 1–3.

Figure 2:
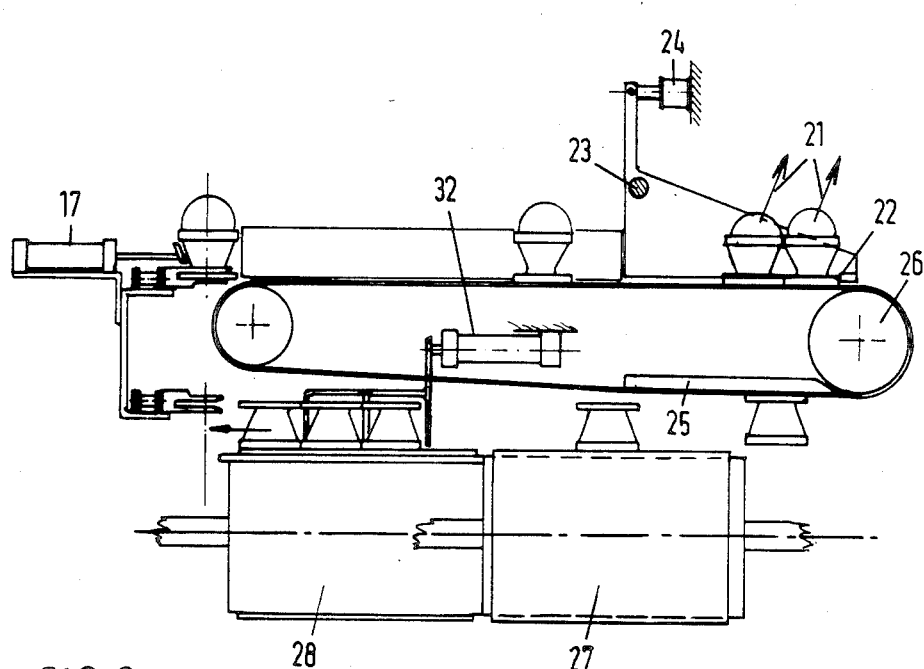
FIG. 2 is a cross-section on the line II—II of FIG. 1.
Figure 4:
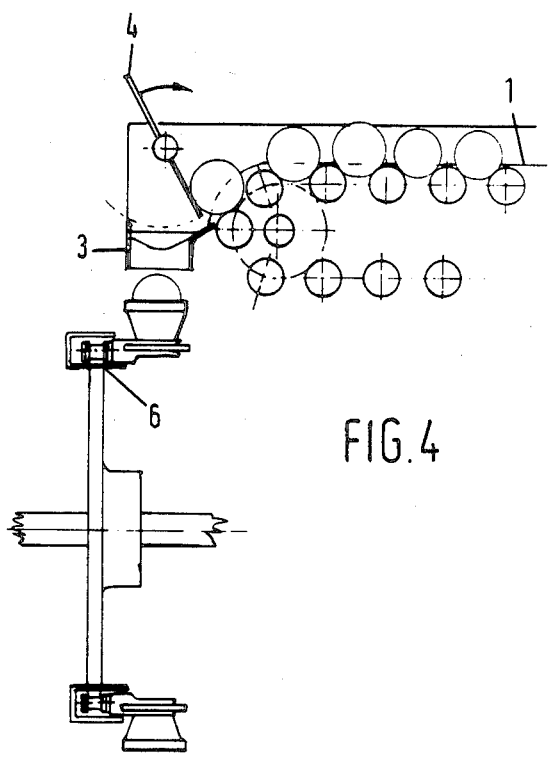
FIG. 4 is a cross-section on the line IV—IV of FIG. 3.

As soon as the filled containers on the buffer belt adjacent the baffles 20 have been brought in the pattern required for further handling, the eggs with suckers, not shown, (see e.g. U.S. Pat. No. 2,658,789) are taken from the containers and discharged (in FIG. 2 shown by arrows 21). The said pattern is obtained partly in that the baffles are provided at the downstream end with a cam 22 by means of which the filled containers supplied are retained. The passage of the containers takes place in such a manner that the baffles 20 are hinged to a shaft 23, and a projection of the baffle is adapted to be operated by a magnet 24.

As further shown in FIG. 2 and as also shown in FIG. 1 by dashed lines, there is provided above the lower run of the buffer belts a bottom plate 25 of a given length. Both the said bottom plate and the return roller 26 disposed at the respective end of the buffer belt in the embodiment shown are made of soft iron, so that the container adjacent the said return roller and bottom plate continues to "adhere" to the moving buffer belt. At the end of the bottom plate, the containers will get detached from the buffer belt and fall on a conveyor belt 27 disposed at a small distance thereunder, moving in the same direction as the feed belt 6. Beside the conveyor belt 27 there is provided a second conveyor belt 28 extending in a sense opposite to that of the conveyor belt 27. Adjacent the last mentioned buffer belt, seen in the direction of movement of the feed belt 6, the bottom plate 25 extends along a larger distance than is the case with all buffer belts arranged in front thereof along the feed belt. As a result, the said bottom plate together with the associated buffer belt functions as transfer mechanism. For the containers supplied via the conveyor belt 27 will stick to the same buffer belt 16 and, together with the containers already sticking thereto, will be moved in the direction of movement of the buffer belt. Since the bottom plate in question terminates at the second conveyor belt 28, the containers at that location will get detached from the buffer belt and fall on the second conveyor belt 28. The conveyor belt 28 returns the containers 5 naturally still upside down to the "inlet end", where an inserting station 29 is arranged. Said inserting station comprises a plurality of baffles 30 disposed above the conveyor belt 28 and extending in the transport direction, as well as a plurality of baffles 31 arranged upstream thereof, transversely to the transport direction, each of the lastmentioned baffles having a different length. Furthermore, there are provided at the end of the said conveyor belt 28 opposite the feed belt 6, adjacent the baffles 31 arranged transversely to the transport direction, a plurality of inserting members 32, which are basically identical to the expelling mechanisms 17, 18 and 19. The number of inserting members 32 corresponds, in the same manner as the expelling mechanisms 17, 18 and 19, to the number of containers per pitch. The arrangement chosen makes it possible to receive the required number of containers at a large speed in the gripping members 11 of the feed chain 6. Moreover, due to this construction with two conveyor belts, i.e. 27 and 28, all containers essentially traverse the same distance, thus preventing obstruction in the system, which would be the case though when the containers should be returned to the inserting station immediately after discharge of the eggs therefrom.

After insertion of the empty containers in the feed belt, these are again moved by the feed belt along a guide plate 33 and a return gear 13 to underneath the chutes 3, where the filling of the containers is resumed.

Figure 5:
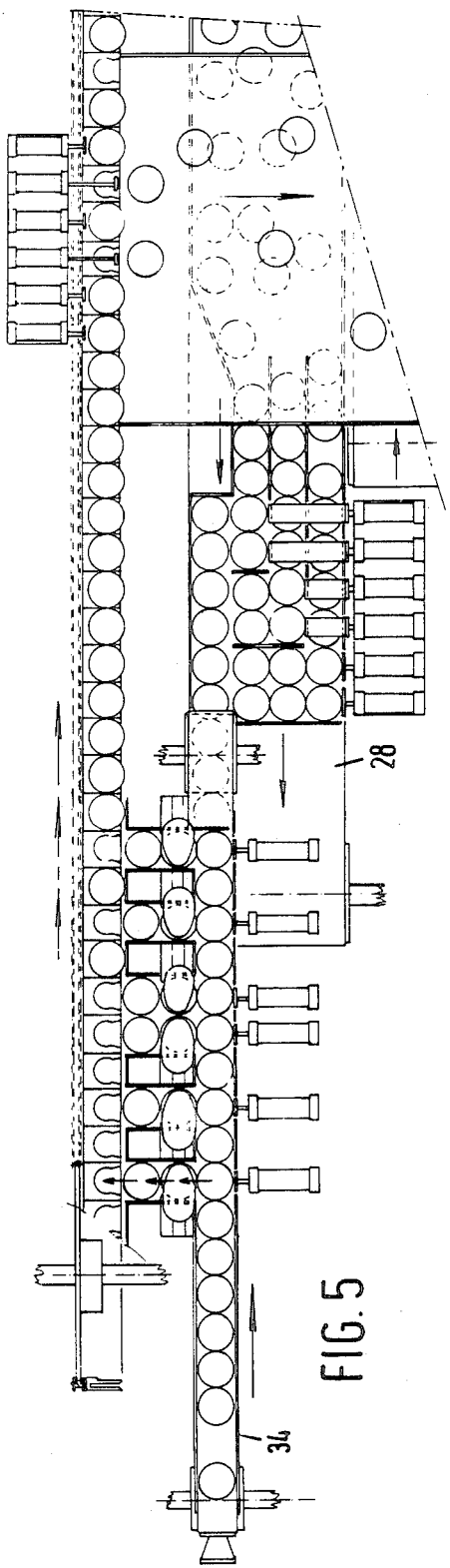
Figure 6:
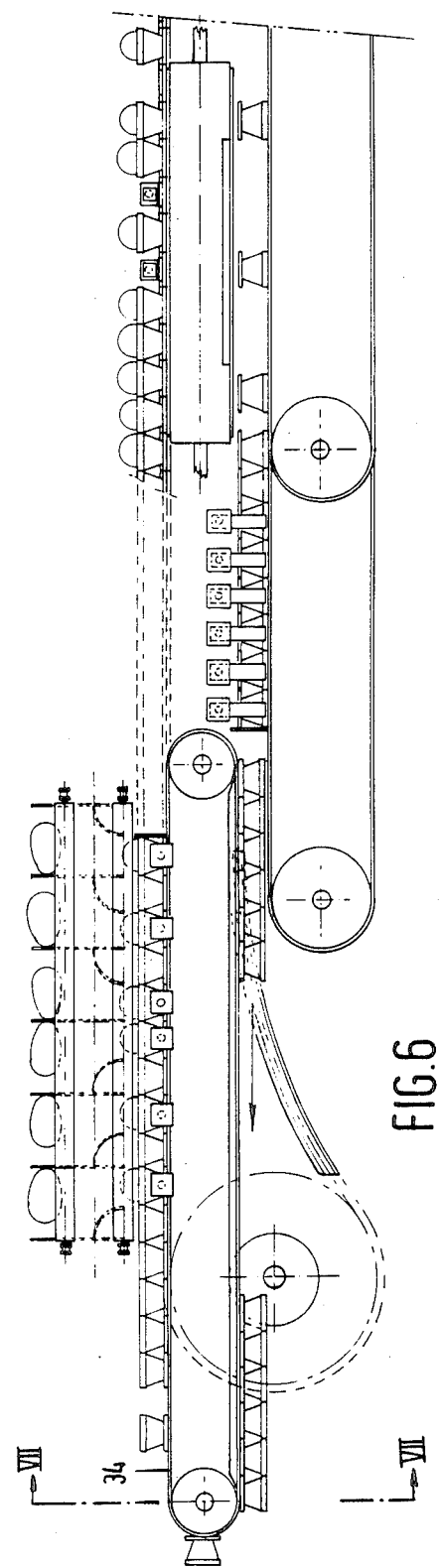

The embodiment described in FIGS. 5, 6 and 7 differs from the above described embodiment in that this is provided with a weighing apparatus; the same parts are therefore shown by the same reference numerals.

In this second embodiment, the empty containers supplied by the conveyor belt 28 are not pushed in the feed belt 6, but on another conveyor belt 34 suitable only for one row of containers. Beside the upper run of the conveyor belt 34, there are arranged a number of scales or weighing cells 35 corresponding to the number of containers per pitch, and which are disposed underneath the chutes 3. As shown in particular in FIGS. 6 and 7, the empty containers supplied via the conveyor belt 33 are pushed from the conveyor belt 34 on the scales 35 by means of an expelling mechanism 36, comparable to the expelling mechanisms 17, 18 and 19. After weighing the empty containers, an egg supplied via the orienting roller conveyor 1 slides therein. After a following step of the conveyor belt 34 and a subsequent movement of the expelling mechanism 36, the containers meanwhile filled with eggs are shifted and moved on a second scale or cell 37, allowing to accurately determine the weight of the egg in question. In the following step of the conveyor belt 34 and the expelling mechanism 36, the weighed egg-filled container is pressed in the gripper 11 of the conveyor belt 6, after which the eggfilled containers are further handled in the manner as desscribed in the above with reference to FIGS. 1-4 and 8-10.

It will be clear that a great many modifications are possible within the scope of the inventive idea without loosing the individual handling of the eggs. As already observed, the apparatuses described have the advantage that the risk of fracture is minimized; nevertheless, temporary storage of the eggs in their containers is possible. Another advantage is that due to the uniformness of the containers, their handling together with the eggs received therein is simple.

What I claim:

1. Apparatus for sorting articles comprising a feed belt capable of receiving a removable container, said container being capable of receiving at least one of the articles to be sorted, a means to classify one of the articles, a plurality of conveying buffer belts arranged along the length of the feed belt, means responsive to said means to classify to remove the containers from the feed belt onto at least one of the buffer belts, the feed belt having a plurality of gripping members to receive the removable containers, a plurality of guide plates arranged above the discharge end of each buffer belt, the guide plates being mounted on a hinged bracket and provided at the downstream end with blocking members for the containers and being tiltable by means of a magnet so as to raise the blocking members to allow the passage of the containers.

2. Apparatus for sorting articles comprising a feed belt capable of receiving a removable container, said container being capable of receiving at least of the articles, a plurality of buffer belt arranged along the length of the feed belt, a means to remove the containers from the feed belt onto one of the buffer belts, a means to remove the article from the container on the buffer belt, a conveying means to transfer the container to an inserting station, the inserting station comprising a first means to weigh the container when empty, a means to deposit an article into the container, second means to weight the container with the received article to thereby classify said article according to weight, and a means to removably attach the container to the feed belt.

3. In a method of handling and transporting a plurality of articles: transporting the articles by a first endless conveyor along a first transport path to succesive stations at each of which at least some of the articles are transferred to a respective second endless conveyor for transport along a second transport path, each article being received in a respective container during at least a part of its transport along both said first and second transport paths arranging a plurality of the containers, each retaining its respective article, on the surface of at least one of said second conveyor, for free independent movement relative to said conveyor surface and relative to other containers carried on said conveyor surface in at least directions parallel to said conveyor surface; and thereafter removing each article from its respective container for further handling, and in which the container is open at the top, at least inwardly narrowing towards the bottom, which container further comprises a foot extending perpendicular to the container axis, the outer circumference of said foot being equal or nearly equal to the outer circumference of the upper edge of the container.

4. A method as in claim 3 wherein, while being transported by said conveyor surface, the containers are guided by guide means so as to be limited to independent movement in preselected directions relative to said conveyor surface.

5. A method according to claim 3 including weighing each container in empty condition and after the reception of an article in the container weighing the container and the article, thus determining the weight and the weight class of the article.

6. In a method of handling and transporting a plurality of articles: transporting the articles by a first endless conveyor along a first transport path to successive stations at each of which at least some of the articles are transferred to a respective second endless conveyor for transport along a second transport path, each article being received in a respective container during at least a part of its transport along both said first and second transport paths; arranging a plurality of the containers continuously being supported by the said second conveyor, each retaining its respective article, on the surface of at least one of said second conveyors, for free independent movement relative to said conveyor surface and relative to other containers carried on said conveyor surface in at least directions parallel to said conveyor surface; and thereafter removing each article from its respective container for further handling and in which the container is open at the top, at least inwardly narrowing towards the bottom, which container further comprises a foot extending perpendicular to the container axis, the outer circumference of said foot being equal or nearly equal to the outer circumference of the upper edge of the container.

7. Apparatus for sorting articles comprising a feed belt capable of receiving a removable container, said container being capable of receiving at least one of the articles to be sorted; means to classify one of the articles according to weight; a plurality of conveying buffer belts arranged along the length of the feed belt; means to remove the containers from the feed belt onto at least one of the buffer belts, the feed belt having a plurality of gripping members to receive the removable containers; a plurality of guide plates arranged above the discharge end of each buffer belt, the guide plates being mounted on a hinged bracket and provided at the downstream end with blocking members for the containers and being tiltable by means of a magnet so as to raise the blocking members to allow the passage of the containers.

8. Apparatus for handling articles comprising a feed conveyor capable to supplying the articles to removable containers, said containers continuously being supported on an upper run of an endless buffer belt having said upper run and a lower run, each container being capable of receiving one of the articles; means to remove the articles from the containers on the buffer belt; conveying means to transfer the containers to an inserting station, the inserting station comprising means to deposit an article into the container; and means to freely movably attach the container to the lower run of the buffer belt.

9. In apparatus for handling and transporting a plurality of articles: a first endless conveyor for transporting the articles along a first transport path to a station; a second endless conveyor at the station having an upper run and a lower run; means for transferring at least some of the articles from the first conveyor to the second conveyor; means for placing each article in a respective container during at least a part of its transport; means for arranging a plurality of the containers, with articles therein, on the upper surface of the upper run of the second conveyor such that during transport by the second conveyor the containers are freely and independently movable, relative to said conveyor surface and relative to other containers on said conveyor surface, in at least directions parallel to said conveyor surface; and means for subsequently removing each article from its respective container for further handling, the first conveyor being provided with gripping or carrying members for releasably receiving the containers, and including at the location of the second conveyor at least one expelling or releasing mechanism for expelling the containers from the gripping or carrying members.

10. Apparatus as in claim 9 wherein directly above the lower run of the second conveyor there is arranged a magnetic plate, wherein said second conveyor includes a magnetic return idler at the discharge end, and wherein each container includes a magnetizable part for magnetic cooperation with the magnetic plate.

11. Apparatus as in claim 10 including a third endless conveyor extending underneath the second conveyor and operating in the same direction as the first conveyor and wherein said magnetic plate terminates at the third conveyor whereby empty containers are transferred to the third conveyor.

12. Apparatus according to claim 11 including a fourth endless conveyor extending underneath the second conveyor, said third and fourth conveyors having upper and lower runs, said fourth conveyor operating in a direction opposite to that of the first conveyor, transfer apparatus for transferring empty containers from said third endless conveyor to said fourth conveyor, said transfer apparatus including a magnetic plate located above the lower run of said third conveyor and extending over the upper run of said fourth conveyor, and an inserting station adjacent the end of said fourth conveyor for inserting empty containers into the carrying members of said first conveyor.

13. Apparatus according to claim 12, wherein the inserting station comprises a plurality of baffles arranged in longitudinal direction above the fourth conveyor and a plurality of further baffles arranged downstream thereof and transverse to the transport direction of the fourth conveyor, each baffle having a different length, and a plurality of inserting members arranged at the end of the fourth conveyor opposite the first conveyor, adjacent those baffles which are arranged transversely to the transport direction.

14. Apparatus as in claim 12 including an inserting station at the end of the fourth conveyor for placing the containers successively on a further conveyor, along which further conveyor there arranged expelling members for transferring each container successively to a first scale disposed underneath a chute, subsequently to a second scale, and finally to the first conveyor.

15. Apparatus according to claim 9 wherein said placing means includes a chute and a mill and mill wing disposed thereabove at a transfer location for transferring eggs from an orienting roller conveyor into the containers.

16. Apparatus according to claim 9 wherein a plurality of guide plates are arranged above the discharge end of the second conveyor, the guide plate being mounted on a hinged bracket and provided at the downstream end with blocking members for the containers, and the guide plates being tiltable so as to allow the passage of the containers.

17. A transport container for an egg for use in an egg handling and transporting machine in which a plurality of such containers are arranged on the upper surface of an endless conveyor for free and independent movement relative to each other and relative to said conveyor surface in at least directions parallel to said conveyor surface, said container being open at its upper end and having a side wall tapering toward its lower end and including at its lower end a foot extending perpendicularly to the container axis, the outer circumference of the foot being equal or nearly equal to the outer circumference of the upper edge of the container, said foot containing a magnetic or magnetizable element, and the inner surface of said container side wall forming an internal egg-receiving recess which tapers inwardly from said open end, said tapering being used to support eggs having variations in size.

18. A container as in claim 17 wherein said inner surface of said side wall has the shape of at least one truncated cone, which surface forms the support means for an egg.

19. A container as in claim 18 wherein said inner surface of said side wall has the shape of more than one truncated cone disposed one above the other.

20. A container as in claim 17 wherein the magnetic or magnetizable element is ring shaped and coaxial with the axis of the container.

* * * * *